(12) United States Patent
Diehl et al.

(10) Patent No.: US 9,403,487 B1
(45) Date of Patent: Aug. 2, 2016

(54) VEHICLE DEPLOYABLE FRONT STEP

(71) Applicant: Ford Global Technologies, LLC, Dearborn, MI (US)

(72) Inventors: Cary Ochen Diehl, Grosse Ile, MI (US); Nadia Preston, Windsor (CA); Julee Harlow, Ann Arbor, MI (US); Scott Milke, Clinton Township (MA)

(73) Assignee: Ford Global Technologies, LLC, Dearborn, MI (US)

( * ) Notice: Subject to any disclaimer, the term of this patent is extended or adjusted under 35 U.S.C. 154(b) by 13 days.

(21) Appl. No.: 14/625,685

(22) Filed: Feb. 19, 2015

(51) Int. Cl.
*B60R 3/02* (2006.01)
*E05B 83/24* (2014.01)

(52) U.S. Cl.
CPC .. *B60R 3/02* (2013.01); *E05B 83/24* (2013.01)

(58) Field of Classification Search
CPC ...... B62D 25/10; B62D 25/105; B62D 25/12; E05B 83/16; E05B 83/24; E05B 83/243; E05B 83/247; E05B 81/13; B60R 3/00; B60R 3/002; B60R 3/005; B60R 3/007; B60R 3/02; B60R 3/04
See application file for complete search history.

(56) References Cited

U.S. PATENT DOCUMENTS

| | | | | |
|---|---|---|---|---|
| 2,204,990 A * | 6/1940 | Haltenberger | ....... | B62D 25/105 16/308 |
| 4,108,458 A * | 8/1978 | Owens | ...................... | B60R 3/02 105/449 |
| 4,159,122 A * | 6/1979 | Stevens | ...................... | B60R 3/02 108/134 |
| 4,274,648 A | 6/1981 | Robins | | |
| 4,750,753 A * | 6/1988 | Dezern | ...................... | B60R 3/02 224/497 |
| 4,911,264 A * | 3/1990 | McCafferty | ............ | B60R 3/007 182/150 |
| 5,067,760 A | 11/1991 | Moore et al. | | |
| 5,139,295 A * | 8/1992 | Escobedo | ................. | B60R 3/00 182/90 |
| 5,538,265 A * | 7/1996 | Chen | ......................... | B60R 3/02 280/163 |
| 5,678,872 A | 10/1997 | Slater | | |
| 6,149,172 A * | 11/2000 | Pascoe | ...................... | B60R 3/02 280/163 |
| 6,168,176 B1 | 1/2001 | Mueller | | |
| 6,174,008 B1 | 1/2001 | Kramer et al. | | |
| 6,840,526 B2 | 1/2005 | Anderson et al. | | |
| 6,926,322 B2 | 8/2005 | Browne et al. | | |
| 7,219,910 B2 * | 5/2007 | Dunford | ................... | B60R 3/00 182/127 |
| 7,637,519 B2 * | 12/2009 | Leitner | ...................... | B60R 3/02 280/163 |
| 8,833,782 B2 * | 9/2014 | Huotari | ...................... | B60R 3/02 280/163 |
| 9,233,586 B1 * | 1/2016 | Howard | ................... | B60D 1/58 |
| 9,308,870 B2 * | 4/2016 | Yang | ......................... | B60R 3/02 |

FOREIGN PATENT DOCUMENTS

EP 0885776 B1 9/2002
WO 9401306 A1 1/1994

* cited by examiner

*Primary Examiner* — Katy M Ebner
(74) *Attorney, Agent, or Firm* — Raymond Coppiellie; Brooks Kushman P.C.

(57) ABSTRACT

A vehicle and a hood release system are provided. The vehicle may include a hood release lever disposed within a vehicle cabin connected to a hood latch assembly and a step assembly disposed within a front portion of the vehicle. The hood release lever may be configured to release the step assembly from a stowed to a deployed position in coordination with releasing the hood latch from primary latching position to a secondary latching position. The step assembly may be configured to release the hood latch from the secondary latching position to allow the hood to fully open.

11 Claims, 6 Drawing Sheets

VEHICLE DEPLOYABLE FRONT STEP

TECHNICAL FIELD

This patent application relates to deployable vehicle steps, and more specifically to vehicle steps used to access a compartment covered by a hood and the deployment of the step being coordinated with a release of the hood.

BACKGROUND

A hood may be any exterior movable body panel on a vehicle that is used to cover an engine, motor, storage, or battery compartment. The hood may be located in a front portion of a vehicle and may be pivotally attached to the vehicle. A hood latch system may be provided with a primary latch to maintain the hood in a closed position on the vehicle. Typically, a single hood latch is located at the center leading edge of the hood, although other systems and configurations have been used. A hood release handle may be located within the interior of the vehicle operatively connected to release the primary latch and pop the hood.

A vehicle having a front opening hood may obstruct a driver's forward view when opened. The hood latch system may be provided with a secondary latch. The secondary latch may act as a safety latch in the event the primary latch is released while the vehicle is moving. A hood having the primary latch released typically raises the hood a predetermined amount and is maintained in an intermediate closed position by the secondary latch. A secondary release lever may be located on the hood latch assembly itself to release the secondary latch.

Servicing components within the compartment covered by the hood may be challenging in vehicles with a high ride height, such as trucks, sport utility vehicles, or utility vehicles. As a result of the high ride height, the current vehicle architecture, and component layout, accessibility to components such as the battery, dip stick, washer fluid, etc. may be inhibited while a $50^{th}$ percentile male (69 inches in height) or a $5^{th}$ percentile female (59.1 inches in height) is standing on the ground.

SUMMARY

In at least one embodiment, a vehicle is provided. The vehicle may include a latch assembly, a step assembly, and a hood release lever. The latch assembly may be connected to the vehicle. The latch assembly may have a primary and a secondary latch configured to maintain a hood in primary and secondary closed positions, respectively. The step assembly may be disposed within a front portion of the vehicle. The step assembly may have a stowed and a deployed position. The hood release lever may be disposed within a vehicle cabin. The hood release lever may be configured to release the primary latch and deploy the step assembly.

In at least one embodiment, a hood release system is provided. The hood release system may include a hood release lever and a step member. The hood release system may be operatively coupled to a hood latch assembly configured to releasably latch a vehicle hood. The step member may be pivotally mounted to a front portion of a vehicle. The step member operatively coupled to the hood latch assembly. The step member may pivot from a stowed position to a deployed position in response to actuation of the hood release lever.

In at least one embodiment, a hood release system is provided. The hood release system may include a hood, a hood release, and a step assembly. The hood may be releasably connected to a vehicle via a latch assembly. The hood release may be connected to the latch assembly. The step assembly may be connected to the vehicle and the latch assembly. The step assembly may be disposed proximate a front bumper of the vehicle. The hood may be released from a closed position to an open position in response to a downward force applied to the step assembly.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1A:
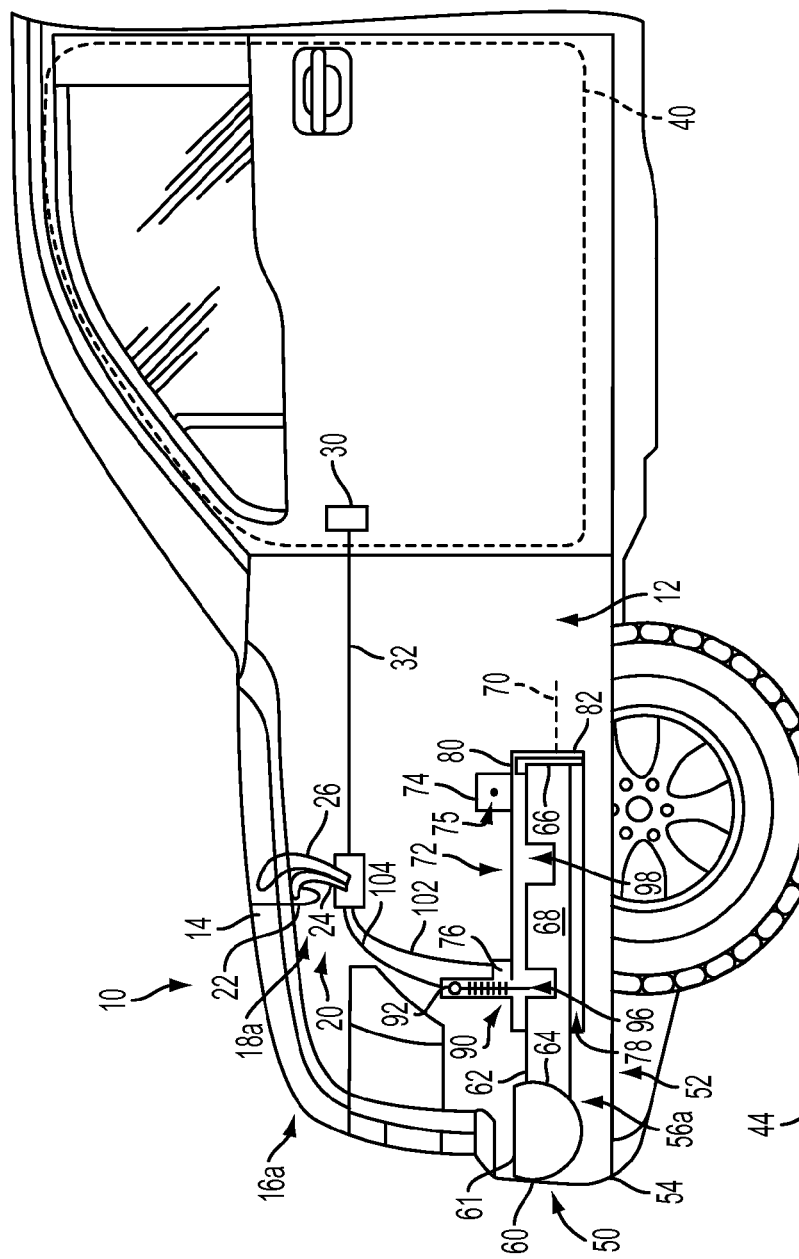
FIGS. 1A and 1B are partial diagrammatic side views of an exemplary embodiment of a vehicle having a deployable front step.
Figure 1B:
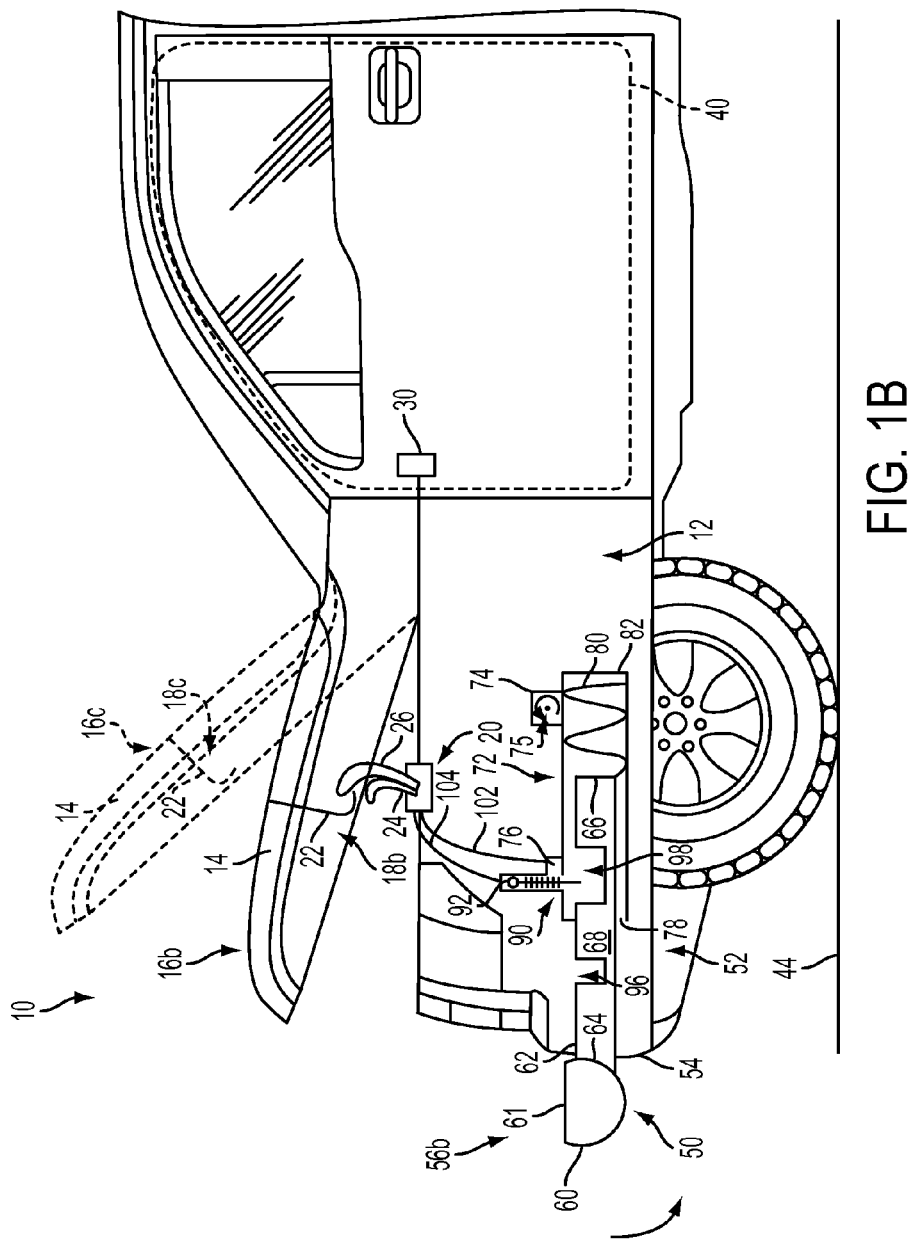

Referring to FIGS. 1A and 1B, diagrammatic views of an exemplary vehicle 10 are shown. The vehicle 10 may be a motor vehicle, such as a truck, sport utility vehicle, or utility vehicle. The vehicle may include an opening or a compartment 12 such as an engine, motor, storage, or battery compartment.

An enclosure such as a vehicle hood 14 may be disposed over the compartment 12. The vehicle hood 14 may be pivotally attached to a vehicle body structure to cover and provide access to the compartment 12. The vehicle hood 14 may move between a primary closed position 16a, a secondary closed position 16b, also referred to as an intermediate closed position, and an open position 16c. The vehicle hood 14 may be moved or pivot with respect to the vehicle body structure to provide access to the compartment 12 in the open position 16c.

A hood latch assembly 20 may be connected to the vehicle body structure. The hood latch assembly 20 may be operatively connected to a hood release 30 disposed within a vehicle cabin 40.

The hood latch assembly 20 may be configured to engage a striker 22 extending from the vehicle hood 14. The vehicle hood 14 may be releasably connected to or latched to the vehicle body structure by the hood latch assembly 20.

The hood latch assembly 20 may be configured to move between a primary latched position 18a, a secondary latched position 18b, and an unlatched position 18c. The hood latch assembly 20 may be configured to move between the primary latched position 18a and the secondary latched position 18b responsive to actuation of the hood release 30 via a first tension member 32. The first tension member 32 may be a cable, linkage, or the like.

The hood release 30 may be a hood release lever, handle, actuator, or the like. In at least one embodiment, the hood release 30 may be a button, switch, or the like operatively connected to a hood release actuator (not shown) that may actuate or move the hood latch assembly 20 between the primary latched position 18a and the secondary latched position 18b.

The primary latched position 18a of the hood latch assembly 20 may correspond to the primary closed position 16a of the vehicle hood 14. The secondary latched position 18b of the hood latch assembly 20 may correspond to the secondary closed position 16b of the vehicle hood 14. The unlatched position 18c of the hood latch assembly 20 may correspond to the open position 16c of the vehicle hood 14.

The first tension member 32 may actuate a primary latch arm 24 responsive to actuation of the hood release 30. The primary latch arm 24 of the hood latch assembly 20 may be configured to engage the striker 22 in the primary latched position 18a. The engagement of the striker 22 with the primary latch arm 24 in the primary latched position 18a may inhibit pivotal movement of the vehicle hood 14 away from the primary closed position 16a.

The first tension member 32 may actuate the primary latch arm 24 to release or disengage the primary latch arm 24 from the striker 22, in coordination with or responsive to the actuation of the hood release 30. The releasing of the primary latch arm 24 may enable the vehicle hood 14 to move from the primary closed position 18a to the secondary closed position 18b. The secondary closed position 18b may be commonly referred to as "popping the hood". The secondary latch arm 26 of the hood latch assembly 20 may be configured to engage the striker 22 in the secondary latched position 18b, subsequent to or simultaneously with the disengagement of the primary latch arm 24. The engagement of the striker 22 with the secondary latch arm 26 in the secondary latch position 18b may inhibit pivotal movement of the vehicle hood 14 away from the secondary closed position 16b.

The secondary latch arm 26 may be configured to release from or disengage the striker 22, and the structure for doing so will be addressed in greater detail below. The disengagement of the secondary latch arm 26 from the striker 22 may permit movement of the vehicle hood 14 from the secondary closed position 16b toward the open position 16c.

A hood sensor 34 may be disposed proximate the hood latch assembly 20. The hood sensor 34 may be configured to provide data indicative of the position of the vehicle hood 14 to a controller 36. The hood sensor 34 may provide data indicative of the primary closed position 16a, the secondary closed position 16b, and/or the open position 16c. The controller 36 may output for display, via a user interface, a warning indicative of a change in the vehicle hood 14 position from the primary closed position 16a to the secondary closed position 16b or the open position 16c.

Vehicle 10 may have a high ride height which may make it more difficult to access components disposed within the compartment 12 while the vehicle hood 14 is in the open position 16c and a person is standing on the ground 44. A step assembly 50 may be provided to improve access to components disposed within the compartment 12 while the vehicle hood is in the open position 16c.

The step assembly 50 may be disposed within a front portion 52 of the vehicle 10. The step assembly 50 may be disposed proximate a front fascia or vehicle bumper 54. The step assembly 50 may be disposed under the vehicle bumper 54, above the vehicle bumper 54, or in-line with the vehicle bumper 54, as shown in FIGS. 1A and 1B.

The step assembly 50 may have a stowed position 56a, as shown in FIG. 1A. The step assembly may have a deployed position 56b, as shown in FIG. 1B. Movement of the step assembly from the stowed position 56a to the deployed position 56b may occur in coordination with actuation of the hood release 30.

The step assembly 50 may include a step member 60, a first member 62, a second member 72, and a biasing member 80. The step member 60 may have a stepping surface 61 configured to receive a foot or a downward force.

The first member 62 may have a first end 64 connected to the step member 60. The first member 62 may have a second end 66 spaced apart from the first end 64. The first member 62 may have an elongate body 68 extending between the first end 64 and the second end 66 along a longitudinal axis 70.

The second member 72 may be connected to the front portion 52 of the vehicle 10. The second member may be connected to the front portion 52 via a first mount 74 and a second mount 76. The first mount 74 may be configured as a pivot mount having a pivot axis 75. The elongate body 68 of the step assembly 50 may pivot about the pivot axis 75 responsive to a downward force applied to the step member 60.

The second member 72 may be a generally elongate body defining a cavity or interior chamber 78. The interior chamber 78 may be configured to receive the second end 66 of the first member 62 and at least a portion of the elongate body 68 of the first member 62 coaxially with the longitudinal axis 70.

The biasing member 80 may be received within the interior chamber 78. The biasing member 80 may be a spring, linear actuator, or the like. The biasing member 80 may be configured to engage the second end 66 of the first member 62 and an internal surface 82 of the second member 72.

The biasing member 80 may be configured to urge the step member 60 and the first member 62 along the longitudinal axis 70. The biasing member 80 may assist the step member 60 and the first member 62 to translate relative to the second member 72. The biasing member 80 may urge the step member 60 of the step assembly 50 away from the stowed position towards the deployed position, in coordination with and responsive to actuation of the hood release 30.

A locking mechanism 90 may be disposed proximate the step assembly 50. The locking mechanism 90 may be connected to or incorporated with the second mount 76. The locking mechanism 90 may include a spring-loaded pin 92. The spring-loaded pin 92 of the locking mechanism 90 may be configured to be received within a first opening 96 or a second opening 98 defined by the first member 62. In at least one embodiment, additional openings may be provided by the first member 62. The additional openings may enable the step assembly 50 to have multiple deployed positions.

The spring-loaded pin 92 of the locking mechanism 90 may be configured to be received within the first opening 96 while the step assembly 50 is in the stowed position 56a. The spring-loaded pin 92 of the locking mechanism 90 may be configured to inhibit movement of the step member 60 and first member 62 of the step assembly 50 away from the stowed position 56a while the step assembly 50 is in the stowed position 56a.

The spring-loaded pin 92 of the locking mechanism 90 may be configured to be received within the second opening 98 while the step assembly 50 is in the deployed position 56b. The spring-loaded pin 92 of the locking mechanism 90 may be configured to inhibit movement of the step member 60 and first member 62 of the step assembly 50 away from the deployed position 56b while the step assembly 50 is in the deployed position 56b.

The locking mechanism 90 may be operatively connected to the hood latch assembly 20 and the step assembly 50 via a second tension member 102. The first tension member 32 may actuate the hood latch assembly 20 to release the primary latch arm 24 from engagement with the striker 22 in response to a first actuation of the hood release 30 that may enable the vehicle hood 14 to move from the primary closed position to the secondary closed position.

The spring-loaded pin 92 of the locking mechanism may be retracted from the first opening 96 via the second tension member 102. The retraction of the spring-loaded pin 92 of the locking mechanism 90 from the first opening 96 may permit the biasing member 80 to urge the step member 60 and the first member 62 of the step assembly 50 along the longitudinal axis 70 from the stowed position 56a to the deployed position 56b.

As the step member 60 and the first member 62 of the step assembly 50 are translating towards the deployed position 56b, the elongate body 68 may ride along a surface of the spring-loaded pin 92 at least until the spring-loaded pin 92 is received within the second opening 98. The combination of the biasing member 80 and the spring-loaded pin 92 may maintain the step assembly 50 in the deployed position 56b.

The step assembly 50 may pivot about a pivot axis of the first mount 74 in response to a downward force applied to the step member 60 of the step assembly 50. The pivoting of the step assembly 50 may actuate the hood latch assembly 20 to release the secondary latch arm 26 from engagement with the striker 22 that may enable the vehicle hood 14 to move from the secondary closed position 16b to the open position 16c.

The spring-loaded pin 92 may retract from the second opening 98 in response to a longitudinal force applied to the step member 60 towards the vehicle cabin 40. The continued application of the longitudinal force may translate the step member 60 and the first member 62 of the step assembly 50 from the deployed position 56b to the stowed position 56a such that the step assembly 50 is completely disposed within the front portion 52.

Figure 2A:
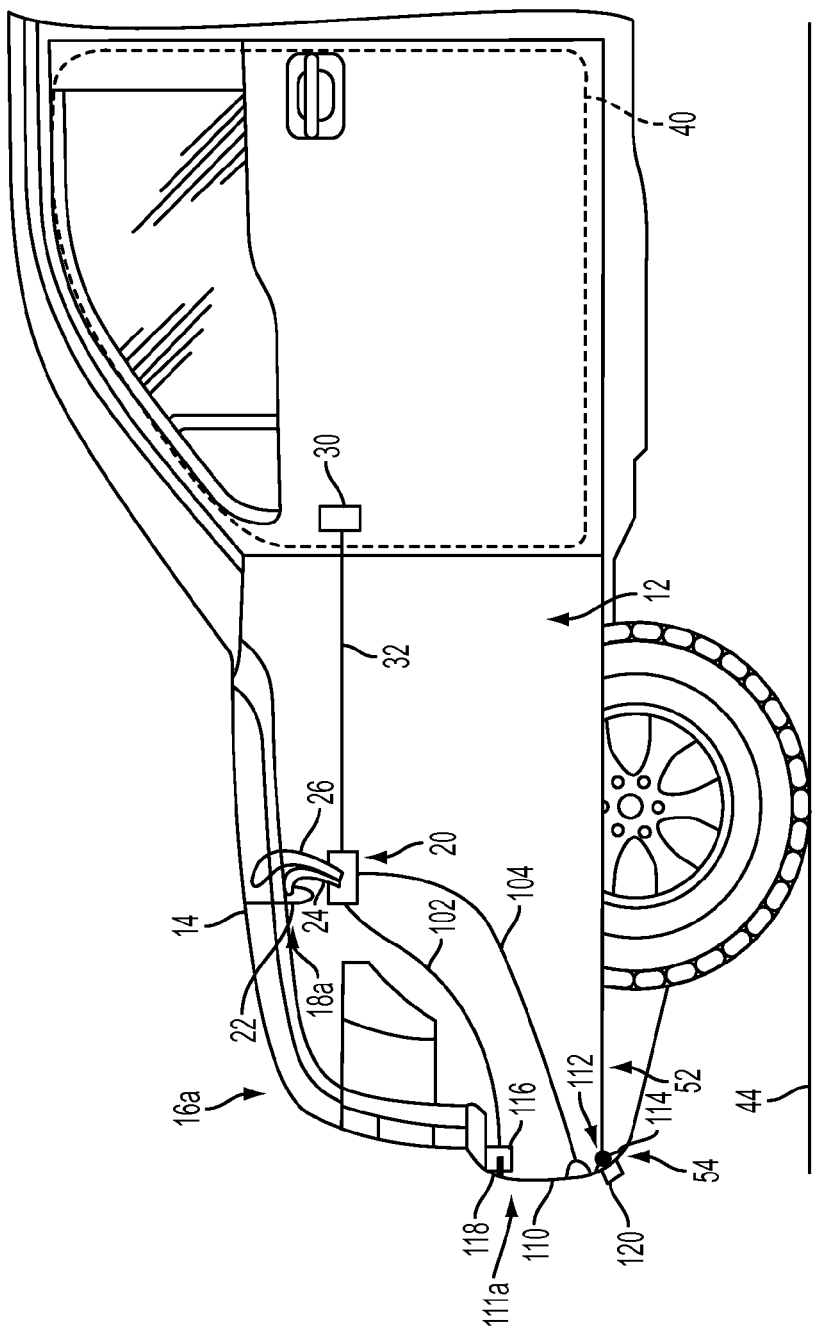
FIGS. 2A and 2B are partial diagrammatic side views of an exemplary embodiment of a hood release system.
Figure 2B:
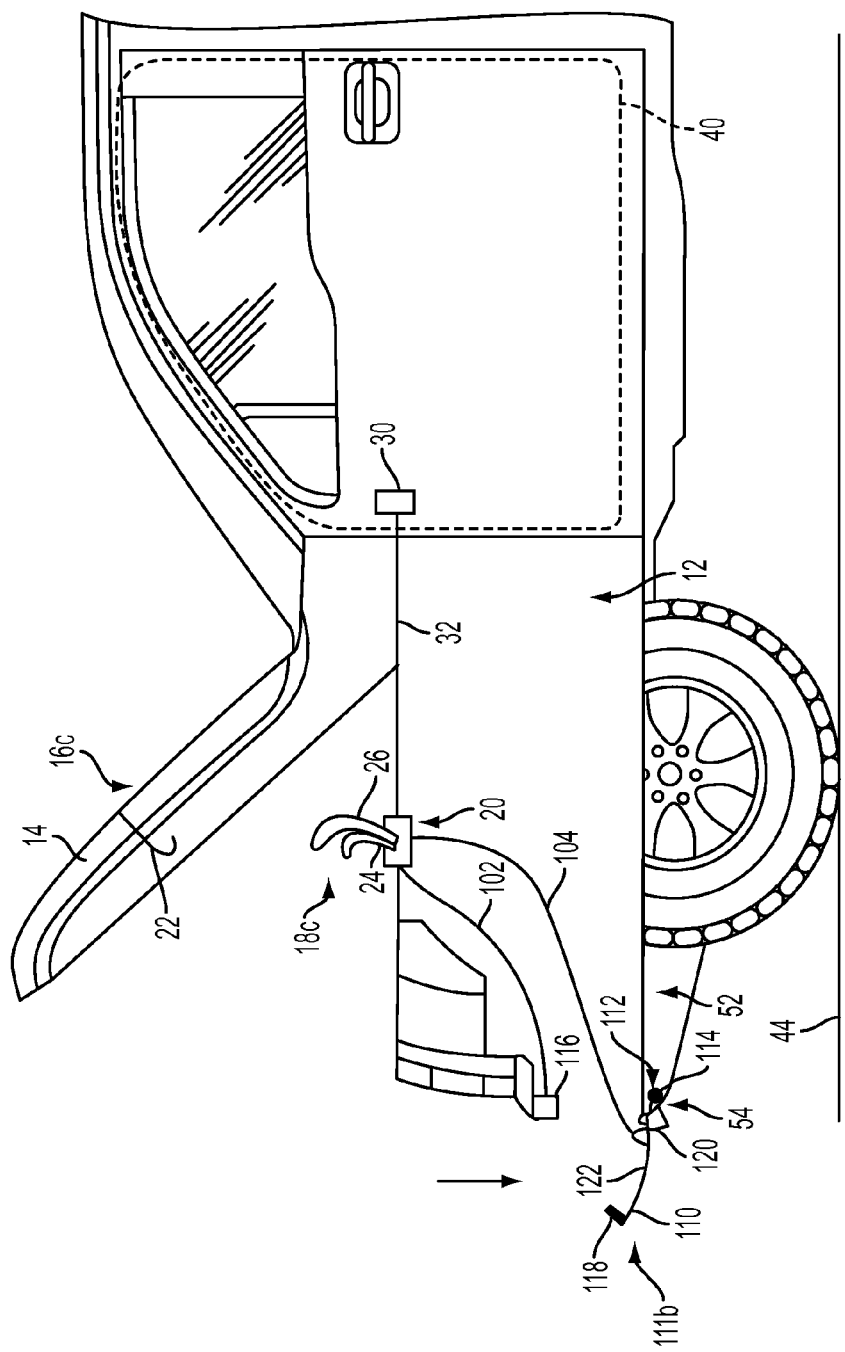

Referring to FIGS. 2A and 2B, an exemplary embodiment of a hood release system is shown. A bumper step member 110 may be pivotally mounted to the front portion 52 of the vehicle 10. The bumper step member 110 may be pivotally coupled to the vehicle bumper 54 via a pivot mount 112 proximate a torsion spring 114.

The bumper step member 110 may have a stowed position 111a as shown in FIG. 2A. The bumper step member 110 may have a deployed position 111b as shown in FIG. 2B.

A latching mechanism 116 may be disposed proximate the front portion 52. The latching mechanism 116 may be configured to engage a step latch 118 extending from the bumper step member 110. The bumper step member 110 may be releasably connected to or latched to the vehicle bumper 54 while the bumper step member 110 is in the stowed position 111a. The latching mechanism 116 may be configured to inhibit movement of the bumper step member 110 away from the stowed position 111a while the bumper step member 110 is in the stowed position 111a.

The latching mechanism 116 may be operatively connected to the hood latch assembly 20 and the hood release 30. The step latch 118 of the bumper step member 110 may be released from engagement with the latching mechanism 116 in coordination with or responsive to actuation of the hood release 30. The bumper step member 110 may pivot about a pivot axis of a pivot mount 112. The torsion spring 114 may control a rate at which the bumper step member 110 pivots from the stowed position 111a to the deployed position 111b.

A stopper 120 may be disposed on the bumper step member 110. The stopper 120 may be disposed proximate a lower portion of the vehicle bumper 54. The stopper 120 may be configured to engage the bumper step member 110 to inhibit further pivotal movement of the bumper step member downwards.

The bumper step member 110 may be operatively coupled to the hood latch assembly 20 via the second tension member 102. The bumper step member 110 may pivot about the pivot axis of the pivot mount 112 in response to a downward force applied to a stepping surface 122 of the bumper step member 110. The pivoting of the bumper step member 110 may actuate the hood latch assembly 20 to disengage the secondary latch arm 26 from engagement with the striker 22 that may enable the vehicle hood 14 to move from the secondary closed position 16b to the open position 16c.

The bumper step member 110 may be pivoted from the deployed position 111b to the stowed position 111a, in response to a force applied to a surface opposite the stepping surface 122 of the bumper step member 110. In at least one embodiment, an operator may kick up on the bumper step member 110 and the latching mechanism 116 may come into engagement with or catch the step latch 118 to retain the bumper step member 110 in the stowed position 111a.

Figure 3A:
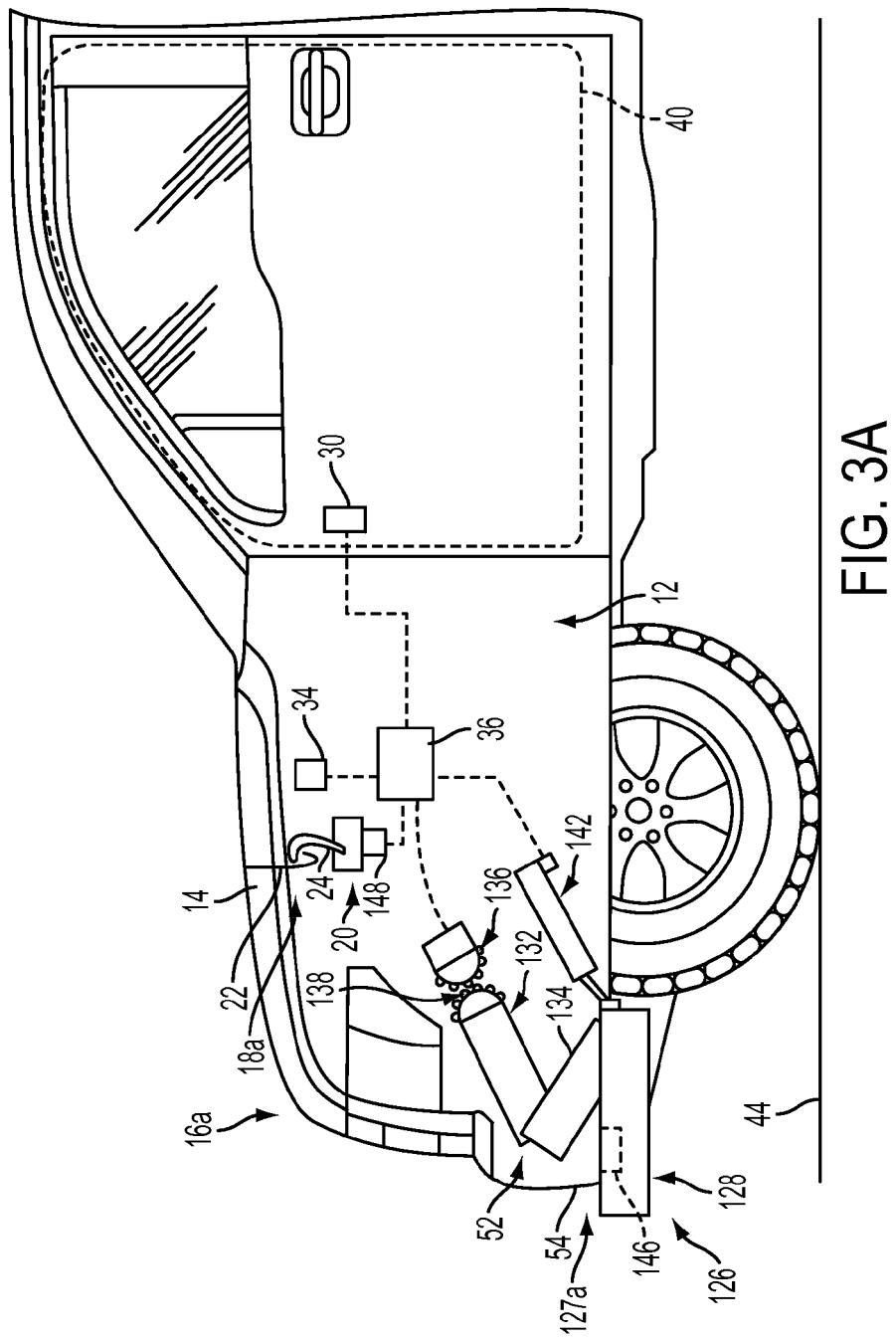
FIGS. 3A and 3B are partial diagrammatic side views of another exemplary embodiment of a hood release system.
Figure 3B:
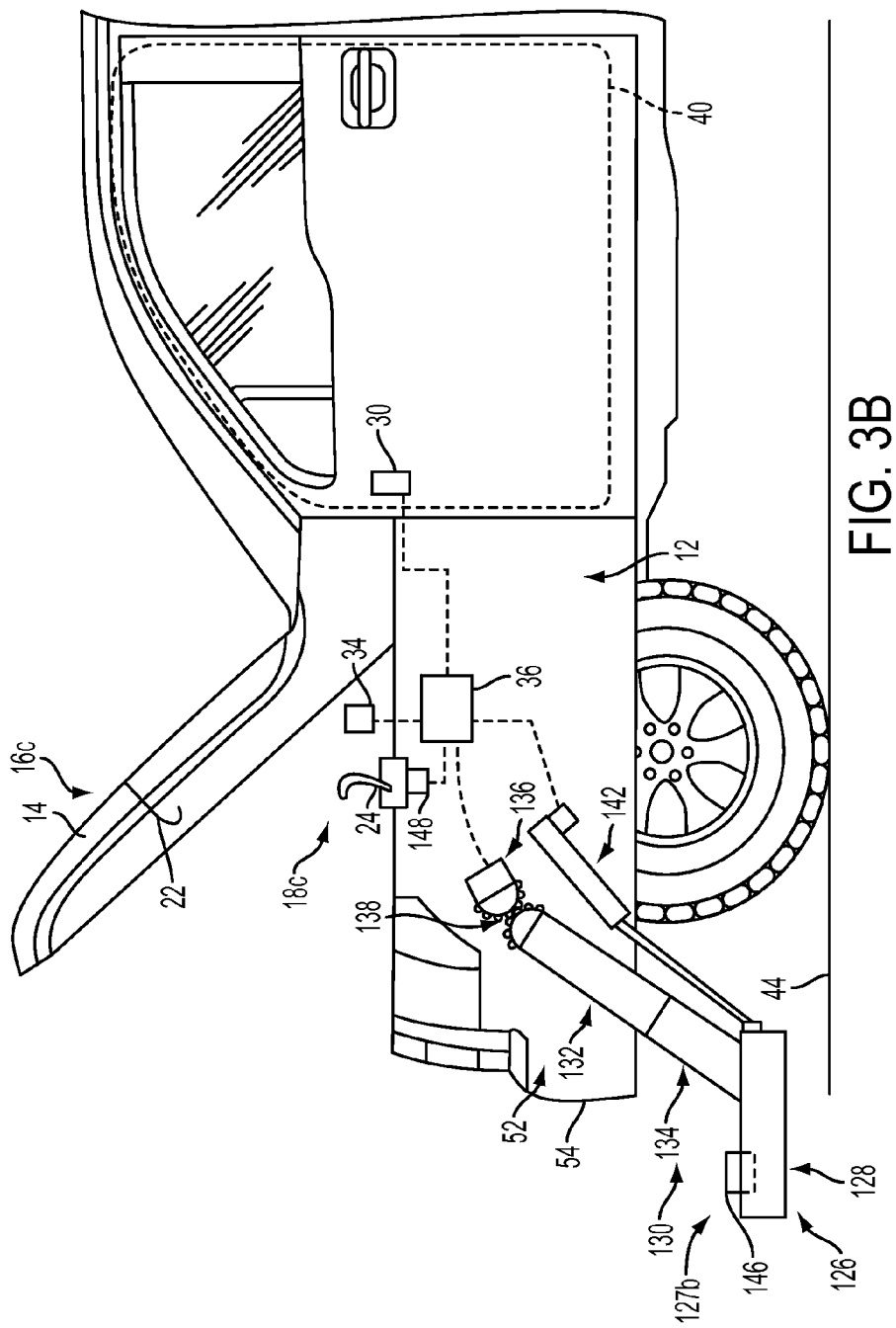

Referring to FIGS. 3A and 3B, an exemplary embodiment of a hood release system is shown. A folding step assembly 126 may be mounted to the front portion 52 of the vehicle 10. The folding step assembly 126 may have a stowed position 127a as shown in FIG. 3A. The folding step assembly 126 may have a deployed position 127b as shown in FIG. 3B.

The folding step assembly 126 may include a step 128, a folding arm assembly 130, and an electric motor 136. The folding arm assembly 130 may have a first portion 132 pivotally connected to the front portion 52 and a second portion 134 pivotally connected to the step 128.

The electric motor 136 may be in communication with the hood release 30, the hood sensor 34, and the controller 36. The electric motor 136 may be drivably connected to the first portion 132 of the folding arm assembly 130. The electric motor 136 may be drivably connected to the first portion 132 of the folding arm assembly 130 via a gearing arrangement 138, or other arrangement that may impart motion to the folding arm assembly 130 relative to the front portion 52 of the vehicle 10. The gearing arrangement 138 may be disposed between the first portion 132 of the folding arm assembly 130 and the electric motor 136.

The gearing arrangement 138 may be configured to inhibit movement of the step 128 and the folding arm assembly 130 of the folding step assembly 126 away from the stowed position 127a while the folding step assembly 126 is in the stowed position 127a. The gearing arrangement 138 may be configured to inhibit movement of the step 128 and the folding arm assembly 130 of the folding step assembly 126 away from the deployed position 127b while the bumper step member 110 is in the deployed position 127b.

The electric motor 136 may be configured to translate the step 128 from the stowed position 127a to the deployed position 127b via the folding arm assembly 130, while the folding step assembly 126 is in the stowed position 127a, in response to a first actuation of the hood release 30. The electric motor 136 may be configured to translate the step 128 from the deployed position 127b to the stowed position 127a via the folding arm assembly while the folding step assembly 126 is in the deployed position 127b, in response to a second actuation of the hood release 30.

The electric motor 136 may be configured to translate the step 128 from the deployed position 127b to the stowed position 127a via the folding arm assembly in response to data provided by the hood sensor 34 indicative of a change in the vehicle hood position while the vehicle hood 14 is in the open position 16c. Data indicative of the vehicle hood 14 movement from the open position 16c to at least one of the secondary closed position 16b or the primary closed position 16a, the controller 36 may operate the electric motor 136 to translate the step 128 from the deployed position 127b to the stowed position 127a.

In at least one embodiment, a gas strut 142 may be disposed proximate the front portion 52. The gas strut 142 may be in communication with the hood release 30, the hood sensor 34, and the controller 36. The gas strut 142 may be drivably connected to the step 128.

The gas strut 142 may be configured to inhibit movement of the step 128 and the folding arm assembly 130 of the folding step assembly 126 away from the stowed position 127a while the folding step assembly 126 is in the stowed position 127a. The gas strut 142 may be configured to inhibit movement of the step 128 and the folding arm assembly 130 of the folding step assembly 126 away from the deployed position 127b while the bumper step member 110 is in the deployed position 127b.

The gas strut 142 may be configured to translate the step 128 from the stowed position 127a to the deployed position 127b via the folding arm assembly 130, while the folding step assembly 126 is in the stowed position 127a, in response to a first actuation of the hood release 30. The gas strut 142 may be configured to translate the step 128 from the deployed position 127b to the stowed position 127a via the folding arm assembly while the folding step assembly 126 is in the deployed position 127b, in response to a second actuation of the hood release 30.

In at least one embodiment, a hood latch release 146 may be provided proximate the stepping surface of the step 128. The hood latch release 146 may be a switch, a button, or the like in communication with the controller 36 and a hood latch actuator 148.

The hood latch actuator 148 may be configured to actuate at least one of the primary latch arm 24 or the secondary latch arm 26 of the hood latch assembly 20 from the primary latched position 18a to the secondary latched position 18b and/or the unlatched position 18c.

The hood latch actuator 148 may be configured to release the primary latch arm 24 from the primary latched position 18a to the secondary latched position 18b in response to depression or activation of the hood latch actuator 148 while the hood latch assembly 20 is in the primary latched position 18a. The hood latch actuator 148 may be configured to release the secondary latch arm 26 from the secondary latched position 18b to the unlatched position 18c in response to depression or activation of the hood latch actuator 148 while the hood latch assembly 20 is in the secondary latched position 18b.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a latch assembly connected to the vehicle having a primary and a secondary latch configured to maintain a hood in primary and secondary closed positions, respectively;
    a step assembly disposed within a front portion of the vehicle, the step assembly having a stowed and a deployed position; and
    a hood release disposed within a vehicle cabin configured to release the primary latch and deploy the step assembly.

2. The vehicle of claim 1 wherein the step assembly includes:
    a step member;
    a first member having a first end connected to the step member and a second end spaced apart from the first end and an elongate body extending therebetween; and
    a second member connected to the front portion of the vehicle, the second member defining an interior chamber, the interior chamber configured to receive the second end along a longitudinal axis of the second member, wherein the first member is configured to translate the step member relative to the second member.

3. The vehicle of claim 2 further comprising a locking mechanism operatively connected with the latch assembly and the step assembly, the locking mechanism configured to inhibit movement of the step assembly away from the stowed position while the step assembly is in the stowed position.

4. The vehicle of claim 3 wherein the locking mechanism is configured to inhibit movement of the step assembly away from the deployed position while the step assembly is in the deployed position.

5. The vehicle of claim 2 wherein the step assembly further includes a biasing member received within the interior chamber of the second member, wherein the biasing member is configured to urge the step member away from the stowed position responsive to actuation of the hood release.

6. The vehicle of claim 3 further comprising a tension member extending between the locking mechanism and the latch assembly, wherein in response to a downward force applied to the step member, the step assembly pivots about a pivot axis to actuate the latch assembly, via the tension member, to release the secondary latch.

7. A hood release system comprising:
    a hood release operatively coupled to a hood latch assembly configured to releasably latch a vehicle hood; and
    a step member pivotally mounted to a front portion of a vehicle, the step member operatively coupled to the hood latch assembly, wherein in response to actuation of the hood release, the step member pivots from a stowed position to a deployed position.

8. The hood release system of claim 7 further comprising a latching mechanism operatively connected to the hood release, the latching mechanism configured to retain the step member in the stowed position.

9. The hood release system of claim 7 wherein the hood latch assembly includes:
    a primary latch operatively coupled to the hood release, the primary latch configured to inhibit movement of the vehicle hood away from a primary closed position to a secondary closed position when engaged with the vehicle hood; and
    a secondary latch operatively coupled to the step member, the secondary latch configured to inhibit movement of the vehicle hood away from the secondary closed position to an open position when the primary latch is disengaged from the vehicle hood responsive to actuation of the hood release.

10. The hood release system of claim 9 wherein in response to a downward force applied to the step member while in the deployed position, the step member is configured to pivot about a pivot mount to release the secondary latch.

11. The hood release system of claim 10 further comprising a stopper disposed proximate the pivot mount, wherein the stopper is configured to engage the step member to inhibit further pivotal movement of the step member.

* * * * *